Aug. 13, 1957 D. T. HURD ET AL 2,802,897
INSULATED ELECTRICAL CONDUCTORS
Filed July 18, 1952
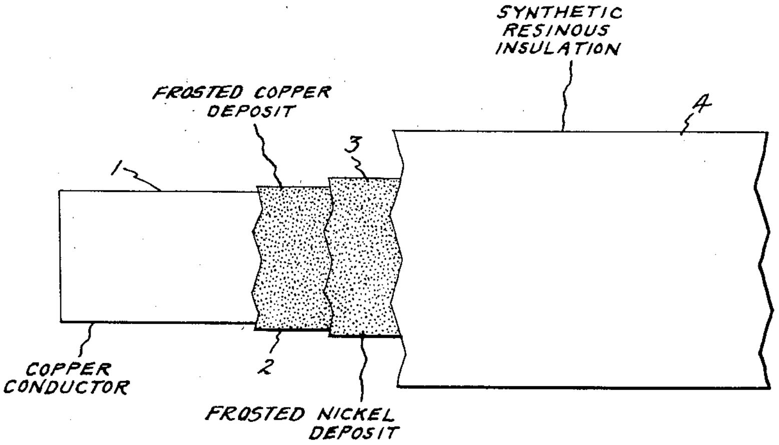
Inventors:
Dallas T. Hurd,
Edith M. Boldebuck,
by Paul A. Frank
Their Attorney.

United States Patent Office 2,802,897

Patented Aug. 13, 1957

2,802,897

INSULATED ELECTRICAL CONDUCTORS

Dallas T. Hurd, Burnt Hills, and Edith M. Boldebuck, Schenectady, N. Y., assignors to General Electric Company, a corporation of New York Application July 18, 1952, Serial No. 299,684

5 Claims. (Cl. 174—110)

The present invention relates to electric conductors which are provided with a sheath of resinous electrical insulation. Our invention is concerned particularly with copper conductors which are sheathed with electrical insulation of the synthetic type. As a class, such insulations exhibit to some extent undesirable chemical reactions with copper particularly at elevated temperatures.

Resinous fluorocarbons, in particular trifluoromonochloroethylene and to a somewhat lesser extent tetrafluoroethylene resin, are illustrative examples.

Chemical reaction between copper conductor, or other copper foundation, and a sheath of synthetic resinous material is a major cause of deterioration of the physical properties of the sheath during operation of electrical apparatus at elevated temperatures. The sheath becomes depreciated, embrittled and loosened from the copper. Although such chemical reaction is particularly pronounced between copper and resinous fluorocarbons, similar though less pronounced chemical effects occur between copper and other forms of synthetic sheathing materials for electric conductors. Organopolysiloxane resins and polyvinyl acetal resins constitute other examples. In all cases, there also is some attack of the copper by atmospheric oxygen diffusing through the insulating sheath at elevated temperatures. This is undesirable as it reduces the effective diameter of the conductor and increases its electrical resistance, particularly in the very fine wire sizes.

Attempts have been made heretofore to interpose a metal shielding layer between the copper body and a sheath or coating of resinous material which is subject to deterioration due to reaction with copper, but such shields have not effectively solved the difficulties encountered. One drawback has been that the insulating sheath did not adhere properly to the metal of the shielding layer.

In accordance with our present invention, there is applied on copper conductors a shielding coating of metal, preferably nickel, which is applied electrolytically over a rough frosted or matte surface on the copper foundation, that is, a surface having irregularities and minute interstices whereby such surface condition is imparted also to the applied shielding coat.

The accompanying drawing shows somewhat conventionally a longitudinal view of an insulated conductor embodying our invention with successive coatings shown in part removed.

The adhesion or bond of a coating of nickel to underlying copper and to overlying resin thus is made secure. Before the electrolytic coating of nickel is applied upon a copper body, a roughened surface condition is produced on the copper foundation, as by electrolytic action, whereby the shielding coating of metal deposited thereon will grip both the copper foundation and the superimposed resin layer. According to a preferred procedure, an electrolytic overlay of copper having a matte of frosted surface structure is electrolytically applied on the surface of the copper conductor. A thin nickel sheath electrolytically deposited thereon assumes a similar characteristic surface structure of the copper which has been referred to as "frosted." A relatively substantial amount of nickel may be deposited upon the copper surface with a reproduction of the frosted or unsmooth structure of the foundation. Such structure is lost only very gradually with the build-up of nickel.

In accordance with a preferred embodiment of our invention, the desired matte surface condition is produced by depositing on the surface of a copper conductor to be treated a preliminary overplate of electrolytic copper under such conditions of deposition that the overplate has a roughened frosted or matte surface, although the desired frosted copper surface may be obtained in other ways such as mechanically abrading as by sandblasting. The presence of such copper overplate layer may improve the bond between the deposited nickel barrier layer and the underlying copper body. What is even more important, the corresponding outer surface structure of the nickel layer plated on the rough copper overplate layer improves materially the adherence or bond between the nickel layer and the overlying resinous insulation. This is particularly important since, in the fabrication of electrical apparatus, the insulated wire must withstand a considerable amount of mechanical rough handling without perforation or abrasion of the insulating sheath. Such abrasive conditions are particularly severe when automatic wire winding machines are employed, as in the fabrication of electrical apparatus.

Referring to the drawing, the core of an electric conductor 1, has provided thereon a thin layer 2 of the matte or frosted copper which is applied electrolytically in a suitable electrolytic bath containing copper compounds. A suitable bath consists of a conventional aqueous solution formulation containing copper cyanide, sodium cyanide and sodium carbonate. Conditions conducive to the formation of a matte deposit of copper include particularly a relatively high current density; a relatively high content of carbonate and a relatively low concentration of cyanide also may be conductive of rough matte or frosted coatings. Similarly, a standard acid copper plating solution, such as one comprising 33 oz. of $CuSO_4 \cdot 5H_2O$ and 8 oz. of conc. $H_2SO_4$ per gallon may be employed to give, in a proper range of plating voltage and current density, frosted matte coatings. It will be appreciated that the particular conditions conducive to the deposition of desirable coatings will be dependent in part on such variables as the composition of the plating bath, the bath temperature, and whether the process is being conducted on a continuous basis. For example, with an acid copper plating bath and static copper wire samples, adherent matte coatings may be produced in about 30 to 40 seconds plating time at 0.5–0.7 volts D. C. applied potential. Voltages of 1.0 volt and above under the particular conditions of an experiment resulted in loose non-adherent deposits; voltages much below 0.5 v. gave deposits which were not as frosted as was desirable. It will be appreciated, however, that under other plating conditions, some other range of potentials may embrace the most desirable conditions for applying the frosted surface coatings. The thickness of copper deposited on the wires generally may be 0.5–3.0 mils; this thickness is not critical, however, provided that the necessary degree of frostiness is reached, and the thinner coatings generally are preferred since they can be formed more economically on a continuous basis.

The original copper wire should be thoroughly cleaned before the plating processes to insure maximum adherence of the subsequently deposited films to the conductor.

A barrier layer of nickel then is applied upon the matte surface of the copper overplate using conventional nickel-plating practice in both constitution and plating schedule of current and time. This process also can easily be adapted to a continuous production of plated wire. The preferred thickness of nickel coating is from about .04 mil, which is about the minimum thickness required to give adequate protection to a sheath of polytrifluoromonochloroethylene resin against the deleterious action of copper in 18 hours at 250° C., to about 0.5 mil. It will be appreciated, however, that the thickness of nickel necessary will vary somewhat depending upon the particular resin used; thus with a polyorganosiloxane resin, which is less sensitive to the deleterious chemical effect of copper at elevated temperature than the fluorocarbon resin mentioned above, somewhat thinner films of nickel are satisfactory and may be employed for economic reasons. The thin nickel layer deposited over the frosted surface has itself a frosted surface corresponding roughly to the matte copper surface. This frosted character of the surface is lost gradually if the nickel film is allowed to build up to thicknesses that are too great, but over a range of thicknesses that are adequate for protection of the resinous sheath from the copper, the maintenance of the frostiness is adequate to assure good adhesion of the resinous layer to the conductor, thus assuring an improved resistance to abrasion and mechanical abuse of the insulated conductor.

On the matte nickel surface a coating 4 of resin such as, for example, polytrifluoromonochloroethylene exhibits improved stability at elevated temperatures and adheres tenaciously, and exhibits a high resistance to contact with the abrading or scraping effect of contacting bodies. Also other resinous coatings at elevated temperatures as high as 250° C. have excellent thermal stability and adherence of the resin coating to the nickel surface.

For example, thermoplastic synthetic resins of the organopolysiloxane group when applied as insulating sheaths on copper conductors are protected from the chemical effect of the copper at elevated temperatures, and also are anchored in position by a nickel shielding layer which is applied and constituted as above described. Polysiloxane resins (also known as Silicone resins) are described in Rochow U. S. Patents 2,258,218–2,258,222 issued October 7, 1941 and in Welsh U. S. Patent 2,449,572 issued September 21, 1948. Such siloxane resins contain an average of 1.0 to 2 and preferably 1.2 to 1.8 hydrocarbon groups per silicon atom. In particular, polysiloxane resins may contain an average of from 1 to 2 methyl, ethyl, and/or phenyl radicals per silicon atom.

Polyvinyl acetal resins, specifically polyvinyl formal resins such as described in Patnode and Flynn Patent 2,085,995 and Jackson and Hall Patent 2,307,588, and superpolyamide resins such as described in Smith and Jackson Patent 2,271,233, constitute other examples of resins which when applied over a nickel coating on copper are protected from chemical attack by the copper at elevated temperature, and the adhesion of which to the conductor is improved by the technique described above.

Similarly alkyd resins and blends thereof with other resins recited herein may be applied on the nicked coating. Alkyd-polyorganosiloxane resins described in U. S. Patent 2,587,295 may be applied on the nickel coating 3 in accordance with our invention.

Somewhat less effectively, but still to a useful extent, the adherence between a resinous insulating film and a nickel barrier coating on a copper wire or other body may be improved by roughening of the nickel coating by an electrolytic procedure preliminary to applying the insulating film. For example, the nickel coating may be electrolyzed cathodically in a conventional nickel plating bath for a short interval at very high current densities. Such treatment produces violent gas evolution at the nickel surface and roughens the nickel surface. For example, treatment for 5 to 20 seconds with a current density of 3 to 4 amps. per square inch effectively roughens the surface. If desired, the composite frosted-surfaced wire prepared as above may be subjected to this treatment prior to enamelling.

Some improvements in the adhesion of a resinous insulating layer also are produced if the copper foundation, prior to the application of a barrier nickel coating, is etched with a suitable acid, for example, concentrated nitric acid, a mixture of nitric acid, sulfuric acid, and zinc chloride, or a solution comprising 5% each of potassium cyanide and ammonium persulfate in water. This etching process, however, does not produce a surface that is quite as matte as that produced by the electrotype deposition of frosted copper.

It will be apparent to those skilled in the art that metals other than nickel similarly may be deposited on a copper conductor to provide a barrier coating, and that the adhesion of resinous insulating materials to such metals may be greatly improved if the surface of the metallic barrier coating is made matte or frosted according to the teaching of our invention. Such barrier metals include aluminum, cadmium, chromium, cobalt, silver, or iron, depending upon the particular resinous material to be applied and the conditions of service operation which the insulated conductor must withstand. Nickel, however, is a preferred material; it is readily available and easily electroplated. It appears to be inert at elevated temperatures to a wide variety of insulating resinous materials, it adequately protects the copper conductor itself from oxidation at elevated temperatures, it has a high degree of flexibility, and the rate of mutual interdiffusion of nickel with copper at elevated temperatures is unusually low in comparison with that of certain other metals that have been used as barrier coatings. This is quite important since a diffusion of the barrier metal into the copper conductor, and vice versa, at elevated temperatures may change the conductivity of the conductor as well as lead to chemical and physical deterioration of the resinous insulating sheath. All of the other metals mentioned above as possible barrier coatings are deficient in one or more of the categories listed immediately above.

It also would be possible to use a third metal to form the frosted underplate for the subsequent deposition of the nickel barrier. This would not be particularly attractive, however, since the copper plating process we employ is quite economical and does not detract from the conductivity of the wire or conductor as would a different metal employed as the matte substrate. The very thin films of nickel have no appreciable effect on the electrical properties of the finished conductor.

What we claim as new and desire to secure by Letters Patent of the United States is:

1. The combination of a copper conductor, an insulating sheath consisting of a heat-converted synthetic resin which is deleteriously affected by copper at elevated temperatures and a shielding film of nickel interposed between said wire and said resin sheath; said nickel film having a frosted surface structure whereby adherence of such nickel to the contiguous surfaces of the wire and the sheath is promoted.

2. An electric conductor comprising essentially (1) a core of copper, (2) an electrically insulating sheath of hydrocarbon substituted polysiloxane resin containing from 1 to 2 hydrocarbon groups for each silicon atom in the molecule, and (3) a coating of nickel having a frosted surface structure interposed between said core and said insulating sheath.

3. The combination of an electric conductor, an overlying copper coating thereon having a frosted surface structure, a nickel coating on said copper coating, said nickel coating having a similar frosted surface structure, and a polytrifluoromonochloroethylene resin externally enclosing said nickel-clad conductor.

4. The combination of an electric conductor, an overlying copper coating thereon having a frosted surface structure, a nickel coating on said copper coating, said nickel coating having a similar frosted surface structure and a polytetrafluoroethylene resin externally enclosing said nickel coat.

5. The combination of an electric conductor, an overlying copper coating thereon having a frosted surface structure, a nickel coating on said copper coating, said nickel coating having a similar frosted surface structure, and an organopolysiloxane resin containing substituted or unsubstituted organic radicals enclosing said nickel-clad conductor.

References Cited in the file of this patent

UNITED STATES PATENTS

| | | |
|---|---|---|
| 781,230 | Rodman | Jan. 31, 1905 |
| 2,126,850 | Whitehead | Aug. 16, 1938 |
| 2,154,834 | De Lamatter | Apr. 18, 1939 |
| 2,296,838 | Domm | Sept. 29, 1942 |
| 2,349,413 | Hemperly | May 23, 1944 |
| 2,418,932 | Harr | Apr. 15, 1947 |
| 2,477,300 | Karfiol et al. | July 26, 1949 |
| 2,593,922 | Robinson et al. | Apr. 22, 1952 |

FOREIGN PATENTS

| | | |
|---|---|---|
| 940,375 | France | May 18, 1948 |
| 626,164 | Great Britain | July 11, 1949 |
| 823,608 | Germany | Dec. 6, 1951 |